(12) United States Patent
Wood

(10) Patent No.: US 8,729,448 B1
(45) Date of Patent: May 20, 2014

(54) SYSTEM AND METHOD FOR AN ENHANCED SMALL PITCH DIGITAL PIXEL ARRAY

(75) Inventor: Lewis Allen Wood, Allen, TX (US)

(73) Assignee: DRS RSTA, Inc., Dallas, TX (US)

( * ) Notice: Subject to any disclaimer, the term of this patent is extended or adjusted under 35 U.S.C. 154(b) by 431 days.

(21) Appl. No.: 13/162,093

(22) Filed: Jun. 16, 2011

Related U.S. Application Data

(60) Provisional application No. 61/355,388, filed on Jun. 16, 2010.

(51) Int. Cl.
*H01L 27/00* (2006.01)
*H01J 40/14* (2006.01)

(52) U.S. Cl.
USPC ................................. 250/208.1; 250/214 R

(58) Field of Classification Search
USPC ................. 250/208.1, 214.1, 214 A, 214 LA, 250/214 LS, 214 AL, 214 SW, 216, 559.47; 348/297–302, 307–309
See application file for complete search history.

(56) References Cited

U.S. PATENT DOCUMENTS 8,089,544 B2 * 1/2012 Funaki .......................... 348/308

* cited by examiner

*Primary Examiner* — Georgia Y Epps
*Assistant Examiner* — Don Williams
(74) *Attorney, Agent, or Firm* — Kilpatrick Townsend & Stockton LLP

(57) ABSTRACT

A system and method for processing optical signals. A photo detection signal is generated in response to sensed conditions determined by one or more pixels of a pixel array. A drive signal is generated for a comparator. An increment signal is generated in response to the drive signal exceeding a reference signal. A counter is incremented in response to receiving the increment signal. The increment signal further activates a switch to reset a capacitor controlling the drive signal. A count value in the counter is read utilizing a summation function to further process the count value corresponding to the photo detection in response to a time period elapsing.

20 Claims, 2 Drawing Sheets

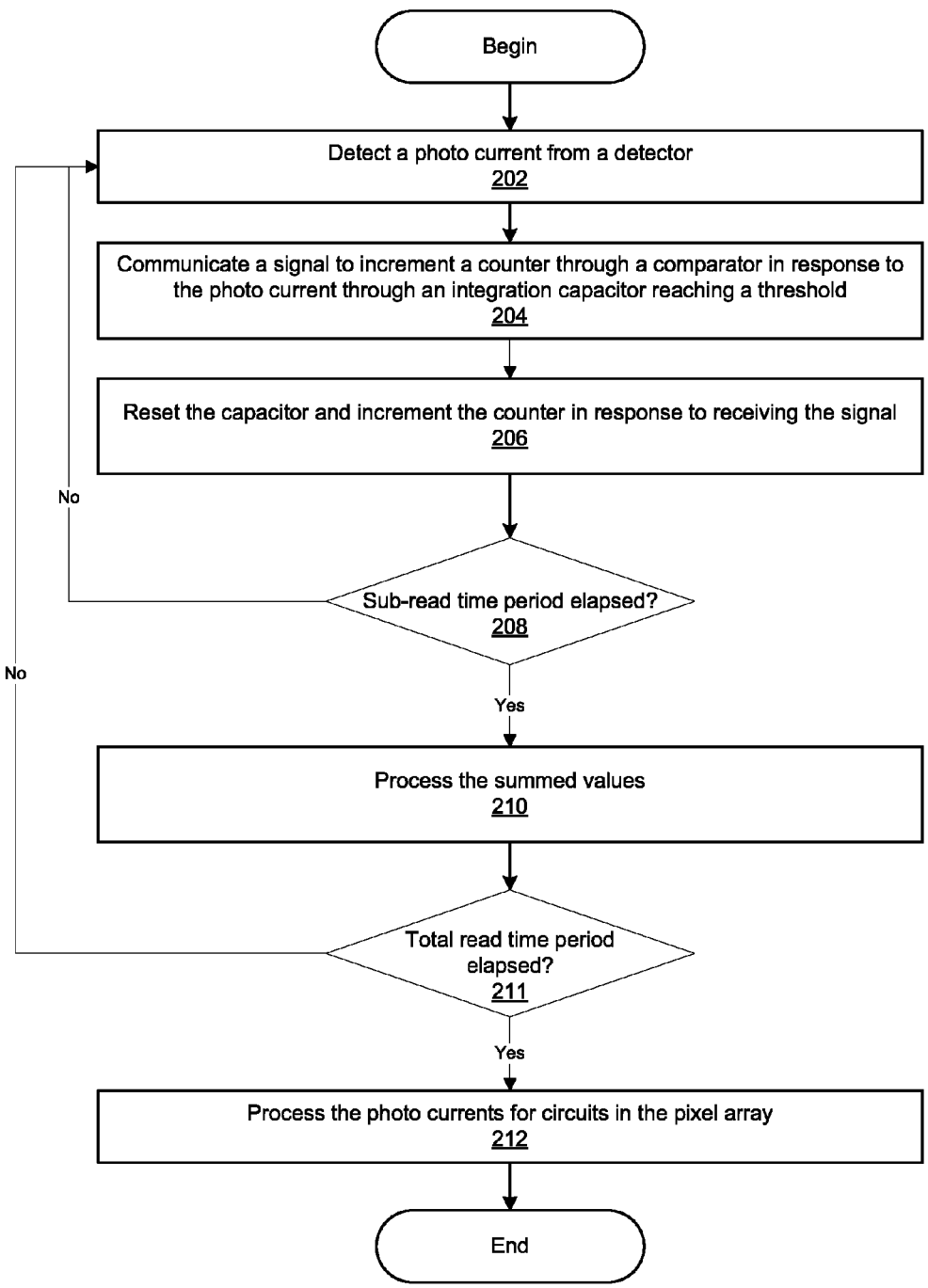

SYSTEM AND METHOD FOR AN ENHANCED SMALL PITCH DIGITAL PIXEL ARRAY

RELATED APPLICATIONS

Figure 1:
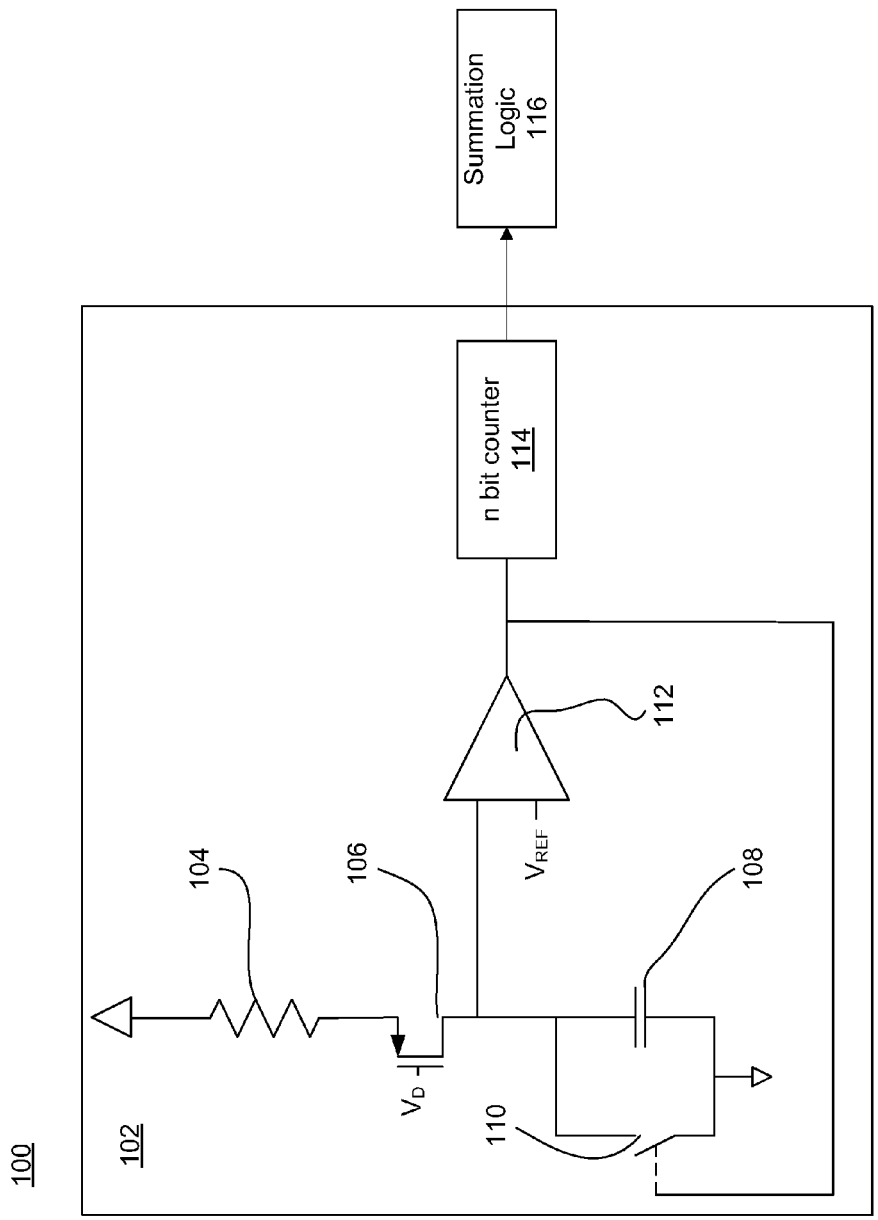

This Application claims priority to U.S. provisional patent application Ser. No. 61/355,388 entitled "System and Method for an Enhanced Small Pitch Digital Pixel Array", filed Jun. 16, 2010. The entire contents of which are hereby incorporated by reference in their entirety.

BACKGROUND

The use of photo detection systems has grown nearly exponentially in recent years for civilian and military systems, devices, and services. Similarly, increased resolution and decreased system size have become expected and advantageous for many situations. In many cases, utilization of elements, such as analog-to-digital converters (ADCs) in pixel arrays of such systems drastically increases the space needed for the pixel array. As a result, complicated manufacturing and silicon processes may be required to obtain desired resolutions and read speeds at significantly more cost per pixel. The current state of the art for analog to digital conversion in electro-optical systems utilizes one and only one of the following: at the output pin only, in the column only, or in the pixel only.

SUMMARY

A system and method for processing optical signals. A photo detection signal may be generated in response to sensed conditions determined by one or more pixels of a pixel array. A drive signal may be generated for a comparator. An increment signal may be generated in response to the drive signal exceeding a reference signal. A counter may be incremented in response to receiving the increment signal. The increment signal may further activate a switch to reset a capacitor controlling the drive signal. A count value in the counter may be read utilizing a summation function to further process the count value corresponding to the photo detection in response to a time period elapsing.

A computing component for processing electro-optical signals. The computing component may include a pixel array for detecting signals in response to sensed conditions. The pixel array may include a plurality of pixels. Each of the pixels may include a detector for detecting the electro-optical signals and a transistor in communication with the detector. The transistor may be operable to generate a drive signal to a comparator. The comparator may be operable to generate an increment signal in response to the drive signal exceeding a reference signal. The drive signal may be controlled by a capacitor in communication with the comparator. The computing component may further include a counter operable to increment a count value in response to receiving the increment signal. The increment signal may further activate a switch to reset the capacitor controlling the drive signal. The computing component may further include a summation function located external to the pixel array operable to read the count value from the counter and further process the count value corresponding to the electro-optical signals in response to a time period elapsing.

BRIEF DESCRIPTION

Illustrative embodiments of the present invention are described in detail below with reference to the attached drawing figures, which are incorporated by reference herein and wherein:

FIG. 1 is a pictorial representation of a photo detection system in accordance with an illustrative embodiment; and FIG. 2 is a flowchart of a process for processing a photo current in accordance with an illustrative embodiment.

DETAILED DESCRIPTION

Illustrative embodiments provide a system and method for reducing the size of a pixel array while maintaining read speeds. The illustrative embodiments may be implemented in a system-on-a-chip (SOC) embodiment or as a pixel array coupled with logic and circuitry to enhance data, information, or signals read from the pixel array. In one embodiment, the size and cost of the pixel array is reduced by reducing a size of counters integrated with the pixel array and in communication with a summation function or logic to generate information corresponding to the signals read from individual photo detectors within the pixel array. The illustrative embodiments utilize a distributed approach by combining a pixel level and a column level for analog to digital conversion.

The illustrative embodiments may utilize methods of manufacturing and joining arrays as disclosed in other DRS Technologies patents, such as application Ser. No. 12/241,649 entitled "Very Small Pixel Pitch Focal Plane Array and Method for Manufacturing Thereof" and U.S. Pat. No. 5,926,217 entitled "Focal Plane Array Integrated Circuit with Individual Pixel Signal Processing" which are incorporated herein by reference in their entirety. Alternatively, bump bonding may be utilized as is known in the art. The illustrative embodiments further expand embodiments and concepts disclosed in patent application Ser. No. 11/415,007 entitled "Digital Readout Method and Apparatus" which is hereby incorporated by reference.

FIG. 1 is a pictorial representation of a photo detection system 100 in accordance with an illustrative embodiment. FIG. 1 illustrates a portion of the photo detection system 100 that may be implemented in a SOC. The photo detection system 100 may include any number of components and elements not specifically shown which are known in the art. In one embodiment, the photo detection system 100 includes a pixel array including a pixel 102 (or unit cell), a detector 104, a transistor 106, a capacitor 108, a switch 110, a comparator 112, and a counter 114. For example, the counter may count up or down or both up and down, and may include any number of bits, i.e., an n-bit counter. The smaller the number of bits, the more advantageous for reducing the physical size of the pixel 102. The photo detection system 100 may further include summation function 116.

In one embodiment, the photo detection system 100 is part of an optical detection system or focal plane array (FPA). The detector 104 is a sensor that detects a signal. In one embodiment, the detector 104 may be a photo diode that generates a photo current or voltage in response to sensed electro-optical signals, light, ultraviolet or infrared signals, or ambient conditions. For example, the photo current may be less than 10 milli amps. The transistor 106 is a transistor configured to set the bias of the detector 104 (as the photo element). A drive voltage for the comparator 112 is generated by the photo current as it is integrated on the capacitor 108.

In one embodiment, the comparator 112 is an operational amplifier operable to compare the drive voltage to a reference voltage to generate an increment signal. The comparator 112 generates the increment signal in response to the drive signal from the transistor 106 exceeding a threshold. The increment signal may instruct the counter 114 to increment the count recorded by the counter. The increment signal may also feedback a reset signal to the switch 110 that is in parallel with the capacitor that effectively resets the capacitor by discharging the capacitor 108. The capacitor 108 may effectively set a sampling frequency for the detected signal based on the capacitor size and transistor 106 output. Other circuits or methods of discharging or removing charge from the capacitor 108 may also be utilized. The comparator 112, capacitor 108, switch 110, and transistor 106 may be utilized to generate a pulse train to the counter 114 defining a least significant bit and may be included for each element in a two-dimensional pixel array.

Preferably, the counter 114 is a small counter, such as, for example, a 6 bit counter. The counter 114 may also be a shift register or other logical counting or mathematical element. As a result, the size of the pixel 102 may be reduced. By reducing the size of the counter 114, the size of each pixel may be reduced while similarly reducing the size of the pixel array so that more complicated manufacturing and silicon processes are not required or, if used, will result in a further reduced array size. If the size of the counter 114 is not carefully contained, the size of the counters in the pixel array may be 80-90% of the total feature size. Each pixel 102 of a pixel array may include a distributed counter and a capacitive element. The counter 114 in the pixel 102 is m bits of a total n bits summed by a counter of an ADC where m is less than n. The counter 114 in the pixel 102 is smaller than a counter utilized to sum the total values.

The elements of the pixel 102 may effectively provide an ADC in each pixel for converting signals read from the detector 104 into a digital value.

The summation function 116 may provide instructions or components that are or include additional counters and logic configured to retrieve the values and information stored by the counter 114. In one embodiment, the summation function 116 includes one or more counter arrays for performing counting in elements external to the pixel array and pixel 102. The summation function 116 may be integrated as part of the column array allowing for easier layout and efficiencies outside of the pixel array. In one embodiment, the summation function 116 includes a timer operable to retrieve the count in the counter 114 at designated intervals.

The summation function 116 may including counters and logic that would otherwise be incorporated in the pixel 102 and pixel array allowing for reduced pixel pitch. Pixel pitch is the physical distance between the pixels (picture elements) in a sensing device. For example, by utilizing the summation function 116, the size of the counter 114 may be reduced from 16 bits to 6 bits, thereby significantly reducing the size of the pixel array. As a result, resolution of the photo detection system 100 may be increased. The summation function 116 may successively sum the count values from one or more pixels until final sums are obtained. The summation function 116 may sum all or a portion of the bits in the pixel 102 as needed.

The data rate utilized to read the values from the counter 114 corresponds to the counter size and overall size of the pixel array as determined mathematically or established by a user. Distribution of the counting elements, with the largest counters being incorporated outside the pixel array, further facilitates efficient communication and layout.

Similarly, less expensive manufacturing processes may be utilized and the complexity of smaller feature sizes need not be addressed. In one embodiment, readout integrated circuit (ROIC) described by the photo detection system 100 may enable a higher frame rate for processing the detected signals. For example, while the values representing an electro-optical signals are being stored in the counter 114, values previously transferred to the summation function 116 may be simultaneously summed, analyzed, and processed for the detected output allowing for a form of parallel processing.

FIG. 2 is a flowchart of a process for processing a photo current in accordance with an illustrative embodiment. The process of FIG. 2 may be implemented by all or portions of a pixel array including interconnected integrated circuitry or logic, such as the photo detection system of FIG. 1.

The process may begin by detecting a photo current from a detector (step 202). In one embodiment, the detector is an optical sensor utilized in a pixel array to acquire optical images from a scene. The photo current represents a signal generated by the detector in response to a sensed input.

Next, the pixel array communicates a signal to increment a counter through a comparator in response to the photo current through an integration capacitor reaching a threshold (step 204). In one embodiment, a voltage or current of the detector may reach a threshold sufficient to increment the counter. For example, a threshold value through the capacitor enables a transistor and comparator to generate an increment signal.

Next, the summation function resets the capacitor and increments the counter in response to receiving the signal (step 206). The capacitor may be reset in response to the increment signal or other signal that is utilized to increment the counter.

Next, the logic determines whether a sub-read time period has elapsed (step 208). The determination may be made by logic components and the read time period may be tracked by a timing element, such as a timer. The time period corresponds to the size of the counter to ensure that the counter does not overflow before the values are read out. If the timer period has not elapsed, the pixel array continues to sense photo current from the detector which may or may not produce another counter increment (step 202).

If the time period has elapsed in step 208, the summation function processes the summed values (step 210) for the entire pixel array. The values may be summed to indicate detected photo currents. The summation of the values in the counter is done so that the size of the pixel array may be reduced by including a smaller counter size. During step 210 the counter in the pixel array may be reset by the logic to begin counting again.

Next, the logic determines whether a total read time period has elapsed (step 211). If the total read time period has not elapsed, the time period is reset and the pixel array continues to detect a photo current from the detector (step 202).

If the total read time period has elapsed in step 211, the logic processes the photo currents for circuits in the pixel array (212). The photo currents may be processed for all or a number of portions of the entire pixel array. Processing may include filtering, compression, noise reduction, communication, or other processing that may process or enhance the image generated by the pixel array.

The previous detailed description is of a small number of embodiments for implementing the invention and is not intended to be limiting in scope. The following claims set forth a number of the embodiments of the invention disclosed with greater particularity.

What is claimed is:

1. A method for processing optical signals, the method comprising:
    generating one or more signals in response to sensed conditions determined by one or more pixels of a pixel array;
    controlling a transmission of the one or more signals from the one or more pixels to a capacitive element, the transmission controlled by passing the one or more signals through a transistor disposed between the one or more pixels and the capacitive element;

generating a drive signal at the capacitive element in response to receiving the one or more signals;

generating an increment signal at a comparator in response to the drive signal exceeding a reference signal;

incrementing a count value in a counter in response to receiving the increment signal, the increment signal further activating circuitry to recharge the capacitive element controlling the drive signal; and reading the count value in the counter utilizing a summation function to further process the count value corresponding to the one or more signals in response to a time period elapsing.

2. The method according to claim 1, wherein the time period is tracked by a time in the summation function to ensure the counter in a pixel does not overflow, and wherein the summation function is analog or digital circuitry.

3. The method according to claim 1, wherein the capacitive element is operable to communicate the one or more signals responsive to a charging time for the capacitive element.

4. The method according to claim 1, wherein the one or more signals are electro optical signals.

5. The method according to claim 1, wherein each pixel of the pixel array includes a counter and a capacitive element.

6. The method according to claim 1, wherein the summation function successively sums the count value until a final sum is obtained.

7. The method according to claim 1, wherein the pixel is m bits of a total n bits of an analog to digital converter, and wherein m is less than n.

8. The method according to claim 1, wherein the method is implemented for a plurality of pixels of the pixel array simultaneously.

9. A distributed computing component for processing electro-optical signals comprising:

a pixel array for generating one or more signals in response to sensed conditions, the pixel array including a plurality of pixels, wherein each of the pixels include:

a detector for generating the one or more signals;

a transistor in communication with the detector, the transistor disposed between the detector and a capacitor and operable to control a transmission of the one or more signals from the detector to the capacitor;

the capacitor operable to generate a drive signal for a comparator in response to receiving the one or more signals;

the comparator operable to generate an increment signal in response to the drive signal exceeding a reference signal; and a counter operable to increment a count value in response to receiving the increment signal, the increment signal further activating a switch to reset the capacitor controlling the drive signal; and a summation function component located external to the pixel array operable to read the count value from the counter and further process the count value corresponding to the one or more signals in response to a time period elapsing.

10. The distributed computing component according to claim 9, wherein the summation function component includes a timer for controlling the time period for reading the count value.

11. The distributed computing component according to claim 9, wherein the summation function component includes additional counters for reducing the size of the counter in the pixel.

12. The distributed computing component according to claim 9, wherein the capacitor controls a sampling frequency for the detector.

13. The distributed computing component according to claim 9, wherein the elements of the pixel act as an analog-to-digital converter.

14. The distributed computing component according to claim 9, wherein the summation function component includes a number of summation components corresponding to the number of pixels, wherein each summation component corresponds to one of the plurality of pixels.

15. The distributed computing component according to claim 9, wherein the summation function component further comprises a counter array.

16. The distributed computing component according to claim 9, wherein the summation function component further comprises a plurality of counter arrays.

17. The distributed computing component according to claim 9, wherein the counter in the pixel is smaller than a total counter.

18. The distributed computing component according to claim 9, wherein the sensed conditions are an electro-optical signal.

19. The distributed computing component according to claim 9, wherein the summation function component may perform summation for all or a portion of the bits of a pixel.

20. The distributed computing component according to claim 9, wherein the counter has a storage capacity of 6 bits.

* * * * *